US008292481B2

(12) United States Patent
Götz et al.

(10) Patent No.: US 8,292,481 B2

(45) Date of Patent: Oct. 23, 2012

(54) HEADLIGHT FOR VEHICLES

(75) Inventors: Mirco Götz, Lippstadt (DE); Franz-Josef Kalze, Harsewinkel (DE); Michael Kleinkes, Lippstadt (DE); Thomas Vieregge, Dortmund (DE); Wolfgang Pohlmann, Lippstadt (DE)

(73) Assignee: Hella KGaA Hueck and Company, Lippstadt (DE)

( * ) Notice: Subject to any disclaimer, the term of this patent is extended or adjusted under 35 U.S.C. 154(b) by 36 days.

(21) Appl. No.: 12/741,371

(22) PCT Filed: Nov. 5, 2008

(86) PCT No.: PCT/EP2008/064966

§ 371 (c)(1), (2), (4) Date: May 4, 2010

(87) PCT Pub. No.: WO2009/059983

PCT Pub. Date: May 14, 2009

(65) Prior Publication Data

US 2010/0264824 A1 Oct. 21, 2010

(30) Foreign Application Priority Data

Nov. 6, 2007 (DE) ......................... 10 2007 052 745

(51) Int. Cl.
*B60Q 1/00* (2006.01)

(52) U.S. Cl. ........................................ 362/545; 262/544

(58) Field of Classification Search .................. 362/800, 362/545, 544, 249.02

See application file for complete search history.

(56) References Cited

U.S. PATENT DOCUMENTS

| | | | | |
|---|---|---|---|---|
| 6,619,825 B2 * | 9/2003 | Natsume | ....................... | 362/509 |
| 7,101,059 B2 * | 9/2006 | Blumel | ......................... | 362/244 |
| 7,185,350 B2 * | 2/2007 | Hong et al. | ................... | 720/698 |
| 7,188,984 B2 * | 3/2007 | Sayers et al. | .................. | 362/545 |
| 7,566,155 B2 * | 7/2009 | Schug et al. | .................. | 362/545 |
| 7,718,959 B2 * | 5/2010 | Franzen et al. | ............... | 250/290 |

FOREIGN PATENT DOCUMENTS

| | | | |
|---|---|---|---|
| DE | 10009782 | A1 | 9/2001 |
| DE | 10153031 | A1 | 6/2003 |
| DE | 10261183 | B3 | 6/2004 |
| DE | 10315133 | A1 | 10/2004 |
| DE | 102004016416 | A1 | 11/2004 |
| DE | 102005030932 | A1 | 1/2007 |
| DE | 102005041234 | A1 | 3/2007 |
| EP | 1780462 | A1 | 5/2007 |
| WO | 2004088200 | A2 | 10/2004 |

* cited by examiner

*Primary Examiner* — Anabel Ton

(74) *Attorney, Agent, or Firm* — H. Frederick Rusche; Robert Haldiman; Husch Blackwell LLP

(57) ABSTRACT

The invention relates to a vehicle headlamp containing a multiple number of LED light sources and at least one optical unit upstream of the LED sources, whereby the LED light sources are arranged in groups with one group of LED light sources to generate a specified light distribution, whereby the LED light sources within one group of LED light sources are of equal size, whereby the dimensions of the LED light sources within one group of LED light sources and/or the optical unit demonstrate the illumination characteristics needed to ensure that the group of LED light sources completely fulfills at least one specified lighting function in the vehicle environment, whereby light spots are produced with a vertical and/or horizontal critical angle within the range of between 0.2° and 1°.

24 Claims, 2 Drawing Sheets

HEADLIGHT FOR VEHICLES

CROSS REFERENCE TO RELATED APPLICATIONS

Figure 1A:
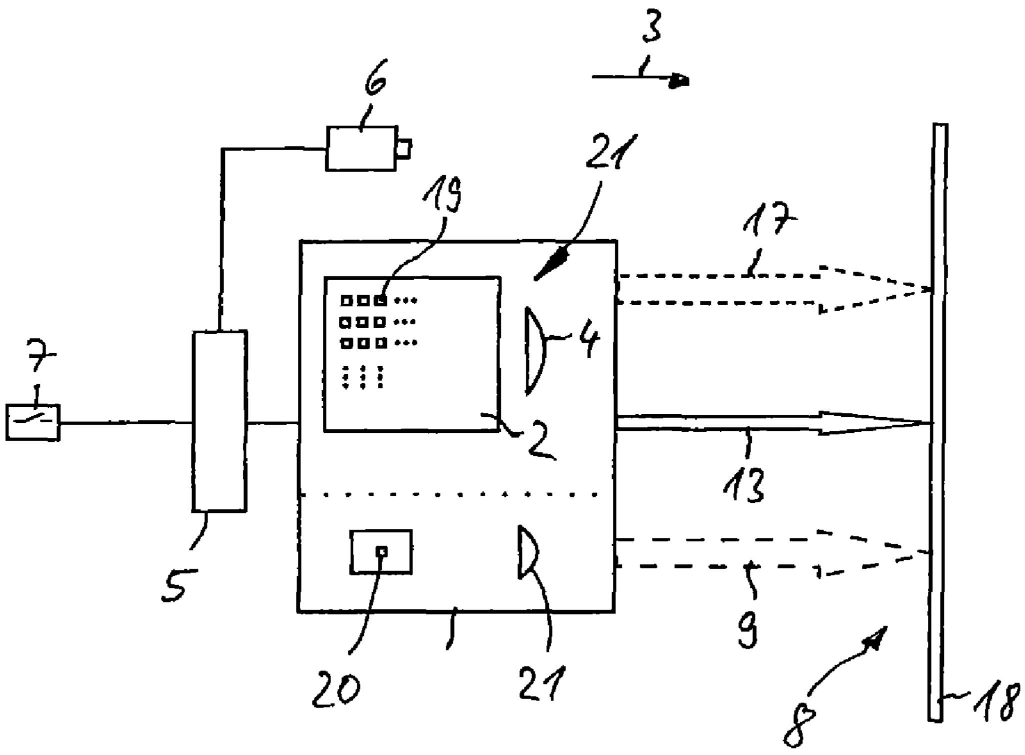

This application is a U.S. National Phase Application of International Application PCT Application No. PCT/EP2008/064966 filed on Nov. 5, 2008, which claims the benefit of priority from German Patent Application No. 10 2007 052 745.6 filed on Nov. 6, 2007. The disclosures of International Application PCT Application No. PCT/EP2008/064966 and German Patent Application No. 10 2007 052 745.6 are incorporated herein by reference.

The invention relates to a headlamp for vehicles with a multiple number of LED light sources and at least one optical unit located upstream of the LED light sources, whereby the LED light sources are arranged in groups, where one group of LED light sources performs a specified lighting function and the LED light sources within a group of LED light sources are the same size.

DE 10 2005 041 234 A1 relates to a headlamp for vehicles with a multiple number of LED light sources to generate a specified light distribution, with an upstream optical unit that produces the light spots in the vehicle environment using the respective LED light sources. The LED light sources are compiled into groups of LED light sources, each of which forms an LED field (LED array) comprised of a multiple number of LED light sources (LED chips) arranged in a matrix shape on a shared substrate. Upstream of each group of LED light sources, which all demonstrate the same dimension, are optical units with illumination characteristics to produce light spots of different sizes in the vehicle environment, depending on the groups of LED light sources. A control unit is used to manage the groups of LED light sources and/or parts of the groups of the LED light sources such that specified light distributions, such as low beam or freeway light distributions, can be generated. Since the size of the light spots produced in the vehicle environment is determined by the design of the optical units, several differently designed optical units must be provided, thus resulting in a specific need for packaging space.

The task of this invention is to further develop a vehicle headlamp with a multiple number of LED light sources to guarantee simply and effectively the provision of light distributions that are adapted to the respective traffic requirements, and to reduce the need for packaging space.

In solving this task, the invention—in conjunction with the generic definition of patent Claim 1—is characterized by the fact that the LED light sources within one group of LED light sources demonstrate a dimension and/or the optical unit demonstrates illumination characteristics such that the group of light sources completely fulfills at least one specified lighting function in the vehicle environment, whereby light spots are produced with a vertical and/or horizontal critical angle within a range between 0.2° and 1°.

The particular advantage of the invention lies in the fact that the formation of just one group of LED light sources of identical dimensions can easily produce a specified light distribution, whereby the illumination characteristics of an optical unit produces light spots of a predetermined and equal size in the vehicle environment. For example, the LED light source within one group can be used to control a high beam distribution and a freeway light distribution. The underlying principle behind the invention is to assign a single optical unit to a group of equally sized LED light sources to produce a multiple number of light spots with the same vertical and/or horizontal critical angle in the vehicle environment in performance of at least two different lighting functions and/or light distributions. The headlamp can be designed to save space, given that only one optical unit is assigned to the LED light sources.

In a preferred design for the invention, the LED light sources are arranged as a matrix in several horizontal and vertical rows on a shared substrate to form one LED field (LED array). The optical unit uses one horizontal row of the LED light sources on the substrate to create a horizontal row of light spots in performance of a lighting function, preferably a freeway lighting function, in the vehicle environment. Expediently, the specified lighting function can be produced with a number of equally sized LED light sources.

In a further development of the invention, at least two horizontal rows of LED light sources are arranged on the LED field and used by the optical unit to produce a first horizontal row of light spots in performance of the specified freeway lighting function, together with a second horizontal row of light spots immediately beneath the first row in the vehicle environment. Expediently, this can prevent too high an illuminance gradient in the vehicle environment.

In a preferred design, the dimensions of the LED light sources within one group of LED light sources and/or the optical unit demonstrate illumination characteristics such that light spots are produced in the vehicle environment with a horizontal critical angle and a vertical critical angle of 0.28° in each case. Expediently, the size of these light spots can be used to create a large number of light distributions.

In a further development of the invention, the quotient of vertical rows of LED light sources on the one hand, and horizontal rows of LED light sources on the other hand, is larger than four, thus enabling the illumination of a relatively large surface in the vehicle environment.

In a further development of the invention, the headlamp has a first group of LED light sources and a second group of LED light sources, whereby the two groups are arranged on the same substrate and the dimension of the LED light sources in the first group differs from that of the second group. The dimension of the LED light sources in the second group of LED light sources is larger than the dimension of the LED light sources in the first group of LED light sources. Expediently, the provision of LED light sources with larger dimensions can reduce the complexity of the LED field. Expediently, the large dimensioned LED light sources in the second group can be used to illuminate relatively large surfaces in the vehicle environment, such as the high beam function, and the relatively smaller LED light sources in the first group of LED light sources can be used to illuminate relatively small surfaces in the vehicle environment, such as the freeway lighting function. By assigning the same optical unit to the groups of LED light sources, the headlamp is relatively compact and space-saving.

In a further development of the invention, the group of LED light sources is joined by at least one further LED light source whose purpose is to provide basic light distribution, such as low beam distribution. By superposing at least one of the groups of LED light sources and the other light sources, different or resulting light distributions can be generated.

Design examples of the invention are explained in more detail using the drawings below.

Figure 1B:
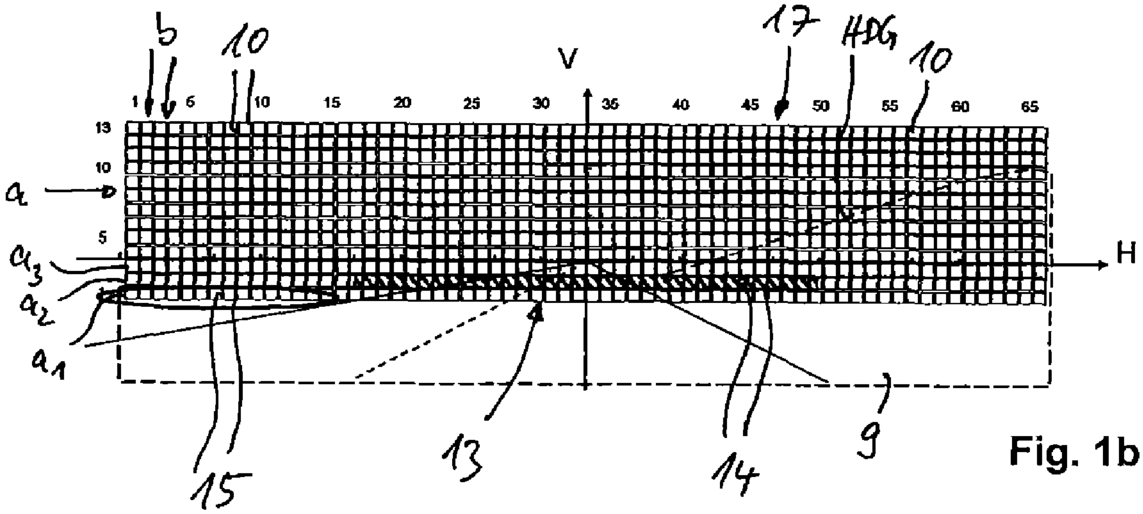
Figure 2A:
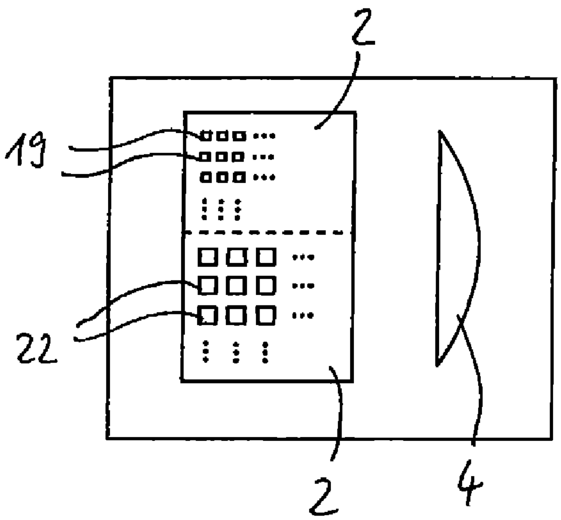
Figure 2B:
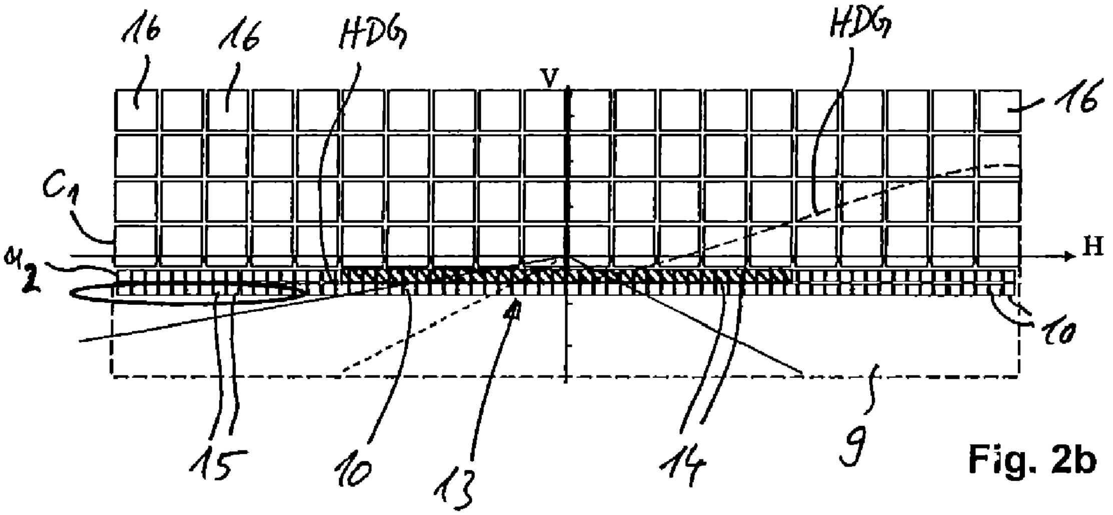

The following are shown:

FIG. 1*a* a schematic depiction of an initial design of an invention-compliant headlamp, FIG. 1*b* a schematic depiction of the light distributions created by the initial design of the headlamp on a measuring wall, FIG. 2*a* a schematic depiction of an alternative substrate for the headlamp with large LED light sources, and FIG. 2*b* a schematic depiction of the light distributions created by the second design of the headlamp on a measuring wall.

A vehicle headlamp substantially consists of a housing 1, containing an arrangement of a multiple number of LED light sources 19, 22 on a shared substrate 2 and an upstream optical unit 4 in light radiation direction 3.

The LED light sources 19, 22 are each designed as LED chips (light emitting semiconductor diodes), whereby the LED chip can comprise one or more LEDs. The substrate 2 is flat and preferably even, whereby one perpendicular of the substrate 2 preferably points in a horizontal direction.

A control unit 5 is assigned to the LED light sources 19; it can be located in or outside the housing 1. The control unit 5 enables at least one LED light source 19 to be optionally switched on, off and/or dimmed.

A sensor unit 6 is assigned to the input side of the control unit 5 to detect objects appearing in the vehicle environment 8 while driving, and to send corresponding sensor signals to the control unit 5 for evaluation. A switch unit 7 is also assigned to the control unit 5 to allow specified light distributions and/or lighting functions to be set manually or in dependency of the settings on the switch unit 7 in the vehicle cockpit. The control unit 5 should preferably include a corresponding signal processing unit to process the switching and/or sensor signals.

A first design of the headlamp contains a first light source 20 and an optical unit 21 assigned to the light source for producing a low beam distribution 9, which is visible as an example on a measuring wall 18 set up at a distance of 10 m to the headlamp in FIG. 1*b*. The LED light source 20 can be designed, for example, as one LED chip with one or several LEDs.

Moreover, the headlamp contains a group of LED light sources 19 (LED chips) arranged on the substrate 2. These LED light sources 19 are each designed as LED chips arranged as a matrix in horizontal and vertical rows. The design example shows thirteen horizontal rows of LED light sources 19 and sixty-six vertical rows of LED light source 19 arranged in an LED field 21. The dimensions of all the LED light sources 19 are the same and are used by the optical unit 4 to create 13×66 light spots 10 arranged in a matrix on the measuring screen 18 shown in FIG. 1*b*; each of the light spots is substantially rectangular, with a horizontal and vertical critical angle of 0.28°. Horizontal critical angle is the term used to describe the solid angle in a horizontal plane, beneath which the light generated by a single LED light source 19 is radiated. Vertical critical angle is the term used to describe such a solid angle, beneath which the light generated by LED light source 19 is radiated in a vertical plane.

The illumination characteristics of the optical unit 4 have been chosen to produce thirteen horizontal rows a of light spots 10 and sixty-six vertical rows b of light spots 10. The horizontal rows a substantially extend above a horizontal H. Only the lower rows $a_1$, $a_2$, $a_3$ extend below the horizontal H. The second horizontal row $a_2$ of light spots 10 can be used to produce a freeway lighting function 13. To this end, the control unit 5 controls a number of LED light sources 19 from the corresponding row of LED light sources 19 to enable the generation of the freeway lighting function 13. The freeway lighting function 13 enables the illumination of the vehicle environment 8 with an increased range in the central area, whereby the correspondingly activated LED light sources 19 in freeway lighting function 13 create light spots 14, which are above a light-dark boundary HDG of the asymmetrical low beam distribution 9.

Preferably, LED light sources 19 can also be activated such that light spots are produced by horizontal row $a_1$ beneath the light spots 14.

In addition, the control unit 5 can activate LED light sources 19 such that light spots 15 are produced in the first row $a_1$ to generate dynamic bending light. Depending on the steering angle of the vehicle, the number of LED light sources 19 and/or differently arranged LED light sources 19 can be switched on or off, such that a different number and positioning of the light spots 15 are produced to perform the bending light function.

All of the LED light sources 19 of LED field 21 on substrate 2 can be switched on to create a high beam distribution 17, whereby superposing of at least the lower rows $a_1$, $a_2$, $a_3$ of light spots with low beam distribution 9 is possible.

In a second design of the headlamp, as shown in FIGS. 2*a* and 2*b*, the substrate 2 contains, on the one hand, a first group of LED light sources 19 and, on the other hand, a second group of LED light sources 22. The first group of LED light sources 19 forms an LED field 21, which the optical unit 4 uses to produce two horizontal rows $a_1$, $a_2$ of light spots 10, whereby the dimension of the light spots 10 is the same as the dimension of the light spots 10 generated by the design shown in FIGS. 1*a* and 1*b*. Since the dimension of the second group of LED light sources 22 is larger than that of the LED light sources 19 in the first group, the same optical unit 4 can be used to produce light spots 16 with a horizontal and vertical critical angle of 0.5°. These light spots 16 extend as a matrix above a horizontal light-dark boundary HDG of low beam distribution 9. The second group of LED light sources 22 can therefore be activated to generate a high beam distribution 17.

The LED light sources 19 in the first group of LED light sources can be activated to produce a number of light spots 14 for performing the freeway lighting function 13 and a number of light spots 15 added in to perform the bending light function.

The range of the freeway lighting function 13 can be controlled by dimming the LED light sources 19 that are used to produce the light spots 14, such that undesired glare effects are suppressed. As shown in FIG. 1*b*, the LED light sources are arranged such that the second horizontal row $a_2$ of light spots 10 is produced within a vertical angle range of between −0.28° and −0.57°. This permits better gene ration of the freeway lighting function 13.

In the second design example, the ratio of the dimension of the LED light sources 22 in the second group to the dimension of the LED light sources 19 in the first group has been chosen such that the quotient of horizontal and vertical critical angles is larger than four and, in this case, is about five.

In a design version of the invention that is not shown here, the LED light sources 22 in the second group of LED light sources 22 can be dimensioned such that light spots are generated with a vertical and/or horizontal critical angle of between 0.2° and 1°.

The same components and/or component functions in the design examples have been given the same reference numbers.

As shown in FIG. 2*b*3, the interfaces of the light spots 15, which are generated by the second group of LED light sources 22, are about three times longer than those of interfaces 11, 12 of the comparatively small light spots 10. The important issue is to ensure that the LED light sources 22 in the second group are larger than the LED light sources 19 in the first group so that the thus generated light spots 16 are smaller than the number of comparably generated light spots 10 above the horizontal H. In the design example shown, the LED light sources 22 in the second group are arranged relative to the LED light sources 19 in the first group in such a way that a bottom horizontal row c1 of the large light spots 16 is directly above the second row $a_2$ of the small light spots 10. The bottom horizontal row c1 of the large light spots 10 is therefore partially beneath the horizontal H.

The first group of LED light sources 19 and the second group of LED light sources 22 clearly generate partial light distributions and/or light shapes that are superposed on the low beam distribution 9 of the additional LED chip.

Several different light distributions can be generated by optionally switching the first group of LED light sources 19 and/or the second group of LED light sources 22 on and off and, if necessary, dimming individual or several of these LED light sources 19.

REFERENCE LIST

1 Housing
2 Substrate
3 Light radiation direction
4 Optical unit
5 Control unit
6 Sensor unit
7 Switch unit
8 Vehicle environment
9 Low beam distribution
10 Light spots
11 Horizontal interface
12 Vertical interface
13 Freeway lighting function
14 Light spots
15 Light spots
16 Light spots
17 High beam distribution
18 Measuring wall
19 LED light sources
20 Light source
21 LED field
22 LED light sources
a Horizontal rows of light spots
b Vertical rows of light spots
H Horizontal

The invention claimed is:

1. A vehicle headlamp comprising:
a multiple number of LED light sources and at least one optical unit upstream of the LED sources,
said LED light sources being arranged in groups with one group of LED light sources being configured to generate a specified light distribution,
said LED light sources within one group of LED light sources being of equal size,
at least one of said LED light sources within said one group of LED light sources and the optical unit have illumination characteristics such that said group of LED light sources fulfills at least one specified lighting function in the vehicle environment, whereby light spots are produced with at least one of a vertical and a horizontal critical angle within the range of between about 0.2° and 1°; and
a control mechanism configured such that a first row of LED light sources can produce a horizontal row of light spots to perform a highway lighting function and a second row of LED light sources can produce another horizontal row of light spots, said second row being located immediately below the other horizontal row of light spots.

2. The headlamp as defined in claim 1 further comprising said LED light sources and the optical unit produce light spots with a horizontal and vertical critical angle of about 0.28°.

3. The headlamp as defined in claim 1, further comprising a quotient of vertical rows of LED light sources and horizontal rows of LED light sources larger than four, one row of LED light sources being arranged in such a way that it produces a row of light spots in a vertical angle range of between about −0.28° and about −0.57°.

4. A vehicle headlamp comprising:
a multiple number of LED light sources and at least one optical unit upstream of the LED sources,
said LED light sources being arranged in groups with one group of LED light sources being configured to generate a specified light distribution,
said LED light sources within one group of LED light sources being of equal size,
said LED light sources within said one group of LED light sources and/or the optical unit have illumination characteristics such that said group of LED light sources fulfills at least one specified lighting function in the vehicle environment, whereby light spots are produced with a vertical and/or horizontal critical angle within the range of between 0.2° and 1°; and
said LED light sources of said first group of LED light sources each demonstrate a first dimension, which is arranged together with a second group of LED light sources on the same substrate;
a second group of LED light sources, each of said light sources of said second group demonstrating a second dimension, such that the quotient from the dimension of the LED light sources in the first group to the dimension of the LED light sources in the second group is less than one.

5. The headlamp as defined in claim 1, further comprising a second group of LED light sources on the LED field said second group of LED light sources being arranged as a matrix in horizontal and vertical direction, such that large light spots are primarily produced above a horizontal (H) on a measuring screen.

6. The headlamp as defined in claim 4 further comprising said first group of LED light sources only comprising one or two rows of LED light sources, such that one or two rows of light spots are produced beneath the horizontal (H) on a measuring screen.

7. The headlamp as defined in claim 4 further comprising said optical unit being located upstream of both said first group of LED light sources and said second group of LED light sources.

8. The headlamp as defined in claim 1 further comprising: at least one additional LED light source being provided to generate a basic light distribution function that can be superposed on lighting functions performed by the first group of LED light sources and/or the second group of LED light sources.

9. A vehicle headlamp comprising:
a multiple number of LED light sources and at least one optical unit upstream of the LED sources,
said LED light sources being arranged in groups with a first group of LED light sources being configured to generate a specified light distribution,
said LED light sources within each group of LED light sources being of equal size, said LED light sources within said first group of LED light sources, either with or without said optical unit, fulfilling at least one lighting function in the vehicle environment and a second group of LED light sources fulfilling at least one other lighting function in the vehicle environment, and said second group of LED light sources producing light spots above a horizontal H on a measuring screen, said light spots above the horizontal being larger than light spots produced below the horizontal.

10. The headlamp of claim 1, further comprising said LED light sources being arranged in several horizontal and vertical rows on a shared substrate to create an LED field, whereby at least one row of LED light sources is arranged in a horizontal row of light spots to perform a specified lighting function.

11. The headlamp of claim 1 further comprising:

said LED light sources of said one group of LED light sources each having a first dimension, which is arranged together with a second group of LED light sources on the same substrate;

said LED light sources of said second group of LED light sources each having a second dimension, such that the quotient from the dimension of the LED light sources in the said one group to the dimension of the LED light sources in said second group is less than one.

12. The headlamp of claim 4, further comprising said LED light sources being arranged in several horizontal and vertical rows on a shared substrate to create an LED field, whereby at least one row of LED light sources is arranged in a horizontal row of light spots to perform a specified lighting function.

13. The headlamp of claim 4 further comprising:

a control mechanism configured such that a first row of LED light sources can produce a horizontal row of light spots to perform a highway lighting function and a second row of LED light sources can produce another horizontal row of light spots, said second row being located immediately below the other horizontal row of light spots.

14. The headlamp of claim 4 further comprising said LED light sources and/or the optical unit produce light spots with a horizontal and vertical critical angle of about 0.28°.

15. The headlamp of claim 4, further comprising a quotient of vertical rows of LED light sources and horizontal rows of LED light sources larger than four, one row of LED light sources being arranged in such a way that it produces a row of light spots in a vertical angle range of between −0.28° and about −0.57°.

16. The headlamp of claim 4, further comprising a second group of LED light sources on the LED field said second group of LED light sources being arranged as a matrix in horizontal and vertical direction, such that large light spots are primarily produced above a horizontal on a measuring screen.

17. The headlamp of claim 1 further comprising a first group of LED light sources only comprising one or two rows of LED light sources, such that one or two rows of light spots are produced beneath the horizontal on a measuring screen.

18. The headlamp of claim 1 further comprising said optical unit being located upstream of both a first group of LED light sources and a second group of LED light sources.

19. The headlamp of claim 4 further comprising: at least one additional LED light source being provided to generate a basic light distribution function that can be superposed on lighting functions performed by the first group of LED light sources and/or the second group of LED light sources.

20. The headlamp of claim 9 further comprising said LED light sources producing light spots with a vertical and/or horizontal critical angle within the range of between about 0.2° and about 1°.

21. The headlamp of claim 9 wherein said first lighting function is a dipped beam and said second lighting function is a high beam.

22. The headlamp of claim 9 further comprising said LED light sources being in horizontal and vertical rows, with a quotient of horizontal to vertical rows being greater than four.

23. The headlamp of claim 9 further comprising said LED light sources being in at least one row, said row producing light spots in a vertical angle range of about −0.28° and about −0.57°.

24. The headlamp of claim 9 further comprising said first group of LED light sources and said second group of LED light sources being on the same array of LED light sources.

* * * * *